United States Patent [19]

Barbagelata et al.

[11] Patent Number: 5,060,186
[45] Date of Patent: Oct. 22, 1991

[54] HIGH-CAPACITY MEMORY HAVING EXTENDED ADDRESSING CAPACITY IN A MULTIPROCESSING SYSTEM

[75] Inventors: Giuseppe Barbagelata, Genova; Bruno Conterno, Genova-Rivarolo; Fernando Pesce, Genova-Sestri, all of Italy

[73] Assignee: Elettronica San Giorgio-Elsag S.p.A., Italy

[21] Appl. No.: 405,408

[22] Filed: Sep. 11, 1989

Related U.S. Application Data

[63] Continuation of Ser. No. 939,174, Dec. 8, 1986, abandoned.

[30] Foreign Application Priority Data

Dec. 13, 1985 [IT] Italy ................................ 68-044 A/85

[51] Int. Cl.[5] ...................... G06F 12/06; G06F 12/08; G06F 12/10; G06F 15/16
[52] U.S. Cl. .................................. 364/200; 364/228.1; 364/243.6; 364/244.8; 364/245.31; 364/246.3; 364/252.6; 364/254.2; 364/255.1; 364/931.46; 364/955.6; 364/957.5; 364/970.5
[58] Field of Search ... 364/200 MS File, 900 MS File

[56] References Cited

U.S. PATENT DOCUMENTS

| | | | |
|---|---|---|---|
| 3,856,613 | 12/1974 | Hauch et al. | 364/200 |
| 3,914,747 | 10/1975 | Barnes et al. | 364/200 |
| 4,037,211 | 7/1977 | Ikuta et al. | 364/200 |
| 4,212,057 | 7/1980 | Devlin et al. | 364/200 |
| 4,309,754 | 1/1982 | Dinwiddie | 364/200 |
| 4,340,932 | 7/1982 | Bakula | 364/200 |
| 4,363,091 | 12/1982 | Pohlman, III et al. | 364/200 |
| 4,403,283 | 9/1983 | Myntti et al. | 364/200 |
| 4,426,680 | 1/1984 | Tague et al. | 364/200 |
| 4,432,053 | 2/1984 | Gaither et al. | 364/200 |
| 4,442,503 | 4/1984 | Schütt et al. | 364/900 |
| 4,805,092 | 2/1989 | Cerutti | 364/200 |

OTHER PUBLICATIONS

W. Wult, "C. Mmp-A Multi-Mini-Processor" Proceedings of the Fall Joint Computer Conference, Anaheim, Calif., pp. 766-777, vol. 41, 1972.

*Primary Examiner*—Archie E. Williams, Jr.
*Assistant Examiner*—Ayni Mohamed
*Attorney, Agent, or Firm*—Gifford, Groh, Sprinkle, Patmore and Anderson

[57] ABSTRACT

A memory accessible by more than one external processor has a data capacity exceeding the addressing capacity of the processors and is capable of modifying the addressing data of the processors.

10 Claims, 2 Drawing Sheets

HIGH-CAPACITY MEMORY HAVING EXTENDED ADDRESSING CAPACITY IN A MULTIPROCESSING SYSTEM

This is a continuation of copending applications Ser. No. 939,174, filed on Dec. 8, 1986 now abandoned.

BACKGROUND OF THE INVENTION

The present invention relates to a high-capacity memory accessible by a number of external agents (particularly processors), having a data capacity possibly exceeding the addressing capacity of each of the said agents, and particularly suitable for use on multiprocessor systems. A need is generally acknowledged for combining high computing power with the ability to handle large streams of in-coming and out-going data, particularly in applications involving complex real-time processing (e.g. image processing, pattern and voice recognition, artifical intelligence and scientific computation in general). The formation of high-computing-power multiprocessor systems poses various problems, including addressing capacity of the memories, and rapid data transfer between different memory groups.

SUMMARY OF THE INVENTION

The aim of the present invention is to provide a high-capacity memory which may be used to advantage on multiprocessor systems, which is accessible by various agents (processors) at different ports, and whereby, for each agent, each word "segment" into which the memory is conceptually divided may be assigned "visibility or non-visibility" by the said agent, access rights (read-only, read/write, perform-only, etc.), and random positioning (addressing) in the agent address space, for the purpose of: exceeding the addressing limits of the agent by dynamically assigning, to part of the segments, the logic function of a "secondary memory" logically equivalent to a disk, or the function of a direct-access main memory, which, though logically equivalent to transferring data from the main to the secondary memory or vice versa, involves no physical transfer of data, which may thus be performed extremely rapidly and regardless of segment size;

dynamically switching a segment from one agent to another, to achieve the equivalent of a data transfer at infinite speed;

dynamically creating areas common to various agents, possibly with different access rights.

Further aims and advantages of the memory according to the present invention will be disclosed in the following description.

With this aim in view, according to the present invention, there is provided a high-capacity memory, characterized by the fact that it is accessible by at least two external agents, and that it comprises means for addressing the said memory independently of the addresses emitted by each of the said agents.

BRIEF DESCRIPTION OF THE DRAWINGS

One embodiment of the present invention will be described, by way of a non-limiting example, with reference to the accompanying drawings, in which.

DETAILED DESCRIPTION OF THE INVENTION

Figure 1:
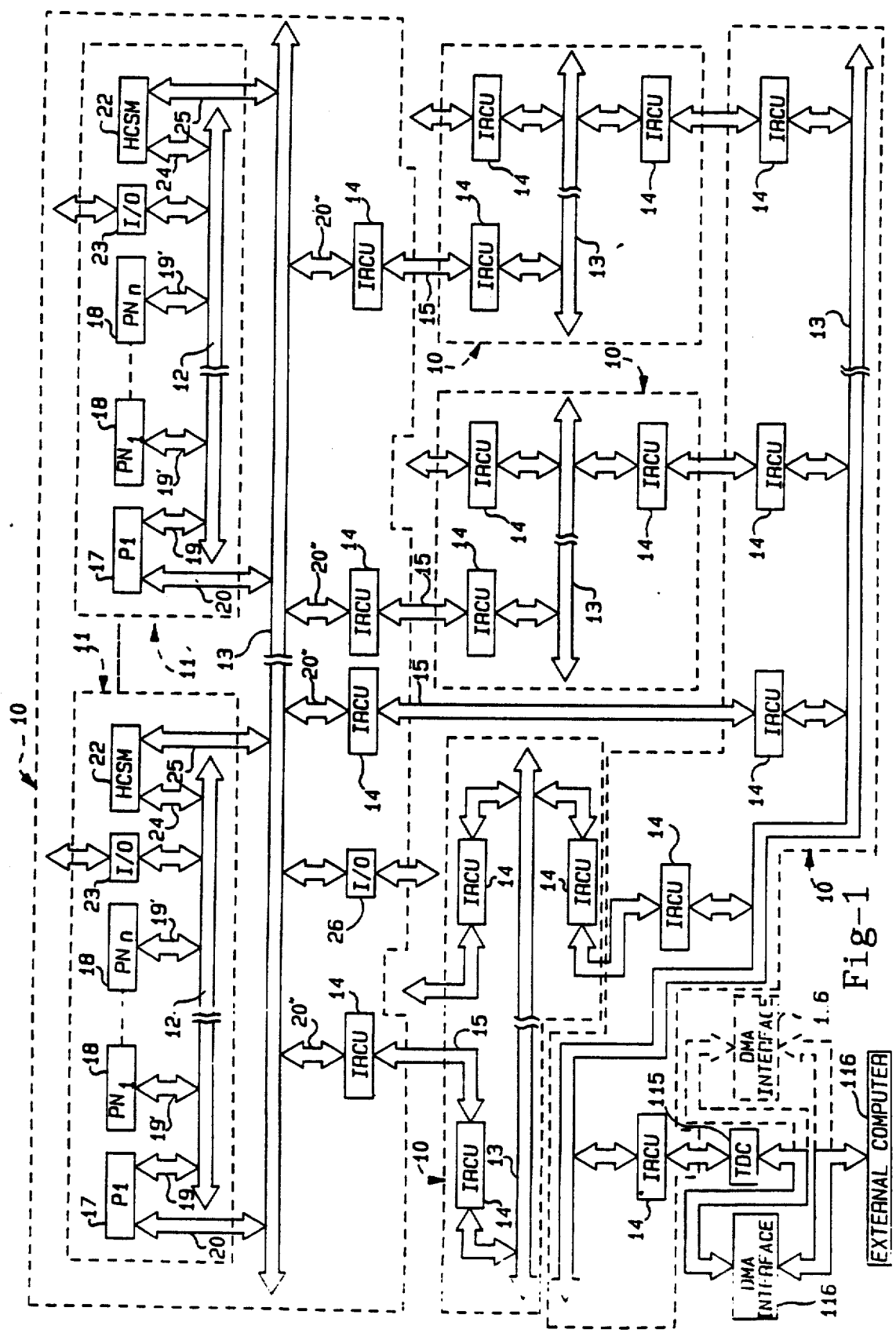
FIG. 1 shows a block diagram of a multiprocessor system to which is applied the memory according to the present invention.

FIG. 1 shows a block diagram of a multiprocessor system to which is applied the memory according to the present invention. The major parts on the said multiprocessor system relative to application of the memory according to the present invention will now be described in detail, the said system itself being described in applicantion U.S. Pat. No. 4,814,970 (issued Mar. 21, 1989) entitled "Multiple-Hierarchical-Level Multiprocessor System", the content of which is incorporated herein by way of reference.

The said multiprocessor system presents a common bus structure and is divided into a number of regions 10, each composed of a group of families 11. Each family consists of a number of processors accessible directly by a common bus 12 (family bus), and all the families 11 in one region 10 are, in turn, accessible directly via a common bus 13 (region bus). Within each region 10, the processors are connected tightly, i.e. affording direct visibility of the entire memory in the region, whereas different regions 10 are connected loosely, i.e. via messages exchanged via units 14 connected by lines 15. System monitoring and supervision functions are conveniently performed by a special region 10' connected, via units 14, to all the other regions 10 on the system, and, via modules described in more detail later on, to an external computer 16. Each family 11 comprises: a monoprocessor module 17 (P1) connected via lines 19 and 20 to family bus 12 and region bus 13 respectively; a number of multiprocessor modules 18 (PN) connected via lines 19' to family bus 12 only; a high-capacity memory block 22 (HCSM) according to the present invention and conveniently of 8 Megabytes; and an input/output block 23 (I/O) for receiving and transmitting data from and to the application environment of the multiprocessor system. Memory block 22 is connected, via lines 24 and 25, to family bus and region bus 13 respectively, whereas block 23 is connected solely to family bus 12. Region bus 13 may also be connected to input/output blocks 26 (I/O) for communicating with peripherals.

Monoprocessor module 17 (P1) thus provides for linking the two (family and region) hierarchical levels.

As shown in FIG. 1, monitoring region 10' is connected to an external computer 16 via unit 14 (IRCU), in turn, connected to a TTL-differential signal converting unit 115 (TDC) connected to computer 16 via a single or two parallel-connected interface modules 116. The said modules 116 may be standard DMA interfaces, e.g. DR11-W, in the case of a VAX11/750 external computer 16 connection.

The various region 13 and family 12 buses present roughly the same characteristics: they support master, slave, and master/slave modules, and carry 5 groups of signals (address and status, data, control, error, and arbitration). Both provide for 32-bit data transfer at a speed, in burst mode, of over 10 Megabytes/second. A 32-bit bus size enables the use of 32-bit processors. Even when using 16-bit processors, however, characteristics may be available for exploting the said bus size for speeding up data transfer. Furthermore, all the memories accessible by the buses are parallel-organized over 32 bits. The multiprocessor system therefore comprises a number of the said regions 10 interconnected via high-speed parallel connections. As inter-regional communication is based on message exchange, the said multiprocessor system may be defined, at this higher level, as a region network, the geometry of which may be defined as required for best catering for a given application. Furthermore, by connecting monitoring region 10' to external computer 16, the entire system benefits from the programs and peripheral devices of ready-made commercial machines. Each region 10 therefore consists of a number of the said families 11, and shares a common memory address space and a common bus 13. To be more precise, a common region address space of 7 Megabytes may be divided into subspaces assigned to memory blocks or processing modules connected to the said region bus 13. These processing units have access to reciprocal memory subspaces via region bus 13.

The structure of each family 11 is fairly similar to that of region 10: a family 11 consists of a group of processing modules sharing a common memory address space and a common bus 12. As in the case of region 10, a family memory space of 8 Megabytes is divided into local (though not private) subspaces for the various processor modules, which are allowed access to reciprocal memory spaces via family bus 12.

The "local" functions of the various region modules are accessible via region bus 13. In particular, cooperation between the family and region levels is supported by modules 17 (P1) and 22 (HCSM). Module P1 is allowed visibility of both the address space of its own family (1 P1 per family) and the region address space to which may be connected a number of families (conveniently 32, for example). P1 also avails itself of the two high-capacity family 12 and region 13 buses, and all the hardware characteristics already described. Block 22 is designed for high-efficiency exchange of large amounts of data between the two environments (family and region). In fact, in addition to having a very high storage capacity, it also has a double port connected to both family 12 and region 13 buses, thus enabling data available in one environment to be made simultaneously available in the other, with the big advantage of not having to go through the system bus, as described in more detail later on with reference to FIG. 2. Memory block 22 (HCSM) presents a memory array 150 with a section 151 for control bits exchanged with a logic error detecting and correcting block 152. The read or write data in memory 150 goes to lines 153 (conveniently 32-bit) connected to two write data registers 154 and 155, respectively connected to family bus 12 and region bus 13, and to two read data registers 156 and 157 also connected respectively to family bus 12 and region bus 13. The data exchanged with memory 150 also goes, via lines 158, to logic block 152, which is also connected, via a read or write control line 159, to line 153, and, via an error signal line 160, to a block 161 for arbitrating requests, controlling the double (family-region) port and timing the control signals of memory 150. The said block 161 supplies memory 150 with address signals 163 (RAS/CAS/ADDRESS).

Family bus 12 is connected:

to two inputs on a multiplexer 166, via two lines, 164 and 165, respectively supplying address bits 16 to 22 or another 7 bits; the output of multiplexer 166 going to a RAM memory block 168 for mapping the family addresses, which block 168 receives a (write) control signal 170 from family bus 12, and the output of which goes to a family bus address and status latch 171;

to the said latch 171 via direct lines 173 supplying address bits 0 to 15;

to a family bus 12 control receiving block 174 which supplies a signal to latch 171;

to the inputs and outputs of a family status and control register 176; and receives a signal 177 from a logic block 178 for data exchange acknowledgment and information.

Region bus 13 is also connected in the same manner to functionally equivalent blocks indicated using the same numbers plus a '.

The status output of latch 171 goes to a status decoding and cycle request generating block 180 connected to block 178 and block 161. The status output of latch 171' is connected in the same manner.

The address outputs (bits 0 to 22) of latches 171 and 171' go to the inputs of a multiplexer 182 controlled by block 161 and the output of which goes directly (via only conjunction or disjunction block 183) or via pipeline 184, to the address input of arbitration block 161 which also controls logic blocks 178 and 178'.

By way of example, the maximum capacity of memory block 22 is 8 Megabytes, divided into 128 segments of 64 Kbytes each. The said memory 22 is visible by both family bus 12 and region bus 13, and, as memory capacity is greater than the address space available for each bus, the present invention provides for a mapping mechanism enabling both buses to exceed the physical 8 Mbyte limit.

The memory is organized on a 32-bit word length (double word) and permits 32-bit (double word), 16-bit (word) and 8-bit (byte) read and write access.

The two (family and region) memory access ports present two identical, independent mapping systems. The logic of the said systems provides for dividing the 8 Mbyte total into 128 segments of 64 Kbytes each, each of which segments may be shifted to any point within the physical address space (within 64 K limits). A physical address is assigned to a given segment by writing the segment number into the mapping register of the relative address.

The mapping registers are grouped into 128-word RAM memory blocks 168 and 168'. In normal read and write cycles of memory array 150, the address from the family and region bus is composed of two parts:

bits 0 to 15 are sent directly to memory array 150 via connection 173 or 173' which goes directly to latch 171 or 171';

bits 16 to 22 are used for extracting from mapping RAM 168 or 168' the (7-bit) segment number assigned to the address. These 7 bits are the most significant bits in the memory array 150 address. Consequently, by modifying the said 7 bits in mapping RAM 168 or 168' (via lines 165 or 165'), the same address from the family or region bus may be used for enabling access to different segments and, therefore, different areas of memory array 150. Address bit 23 is set to zero on region bus 13, and to one on family bus 12, and is not employed by mapping logic.

Mapping register 168 or 168' also contains:

1 bit for defining a "read/write" or "read-only" segment;

1 bit for determining whether an HCSM memory segment exists at that particular address;

1 parity check bit generated and controlled directly on the module.

The mapping mechanism on the present invention provides for installing a number of memories 22 (HCSM) on the same region or family bus, as well as for enabling exclusive visibility of the memories by the region or the family. Furthermore, a segment shift involves no data transfer, simply the modification of a mapping register on block 168 or 168'.

The memory 22 control program initializes and modifies the family and region mapping RAMs 168 and 168' by obtaining access to a specific (switch-selectable) portion of the family and region I/O space.

Control registers 176 and 176' are provided with a bit for preventing access to memory 22 until the control program has initialized mapping RAMs 168 and 168'.

As the said memory block 22 (HCSM) is designed for interfacing with the buses on the system according to the present invention, it must take into account specific characteristics of the said buses, such as, pipeline address generation, 8-, 16-, 32-bit data transfer, and the possibility of discontinuous or locked access. To this must also be added the fact that memory 22 is a double-port type, which means provision must be made for controlling the conflicting priority of fully asynchronous in-coming requests from region bus 13 and family bus 12.

The temporary address storage problem is overcome by storing the addresses in latches 171 and 171'. Status (e.g. DOUBLE WORD) signal decoding supplies dynamic memory control block 161 with information concerning the type of cycle requested. The same block 161 also provides for request synchronization and arbitration, as well as for ensuring "locked" data transfer. For improving write cycle access time, two registers 154 and 155 (one for each bus) have been provided for accommodating input data and so terminating the bus cycle in as short a time as possible. Random read cycles are penalized by the access time of dynamic memory 150, to which must be added the delay introduced by logic error detecting and correcting block 152, and request synchronization time.

Performance is considerably improved in the case of sequential and locked access, whereby the address of the memory location to be requested in the next cycle may be "forecast", and pipelining logic activated for withdrawing the data item in advance and so ensuring it is made immediately available when requested by the master. In this case also, therefore, the bus is engaged for a minimum length of time.

Such performance applies to all types of read operations: double word, word and byte.

The data item withdrawn from memory 150 is, in any case, accommodated in two separate registers 156 and 157 (one for each bus), for preventing possible interference between cycles activated by different buses.

Memory array 150 is parallel-organized over 32 bits for fully exploiting the transfer capacity of the memory according to the present invention.

To the 32 data bits are added 7 error check bits. Using 256 Kbyte chips, this gives a total of eight 1 Mbyte memory banks, each with a total of 312 memory chips.

32-bit parallel organization also enables a certain amount of saving in the number of error check chips, with no impairment in the 16- or 8-bit reading performance of the system. As memory matrix 150 is formed from dynamic components, which are more susceptible to "soft" errors, the logic of module 22 (HCSM) provides for single bit error correction, and error detection over two or more bits. The said HCSM module may also be formed in 6, 4, 2 Mbytes, with or without error detection and correction via block 152.

In its more general form, the high-capacity memory according to the present invention may comprise a main memory array block 150 of $2^N$ words, accessible by p different agents (in particular, processors) at p different ports, and divided conceptually into $2^{N-K}$ segments of $2^K$ words each. The physical address of any one word on block 150 therefore consists of N bits, of which N-K indicate the segment, and K the word within the segment.

Figure 2:
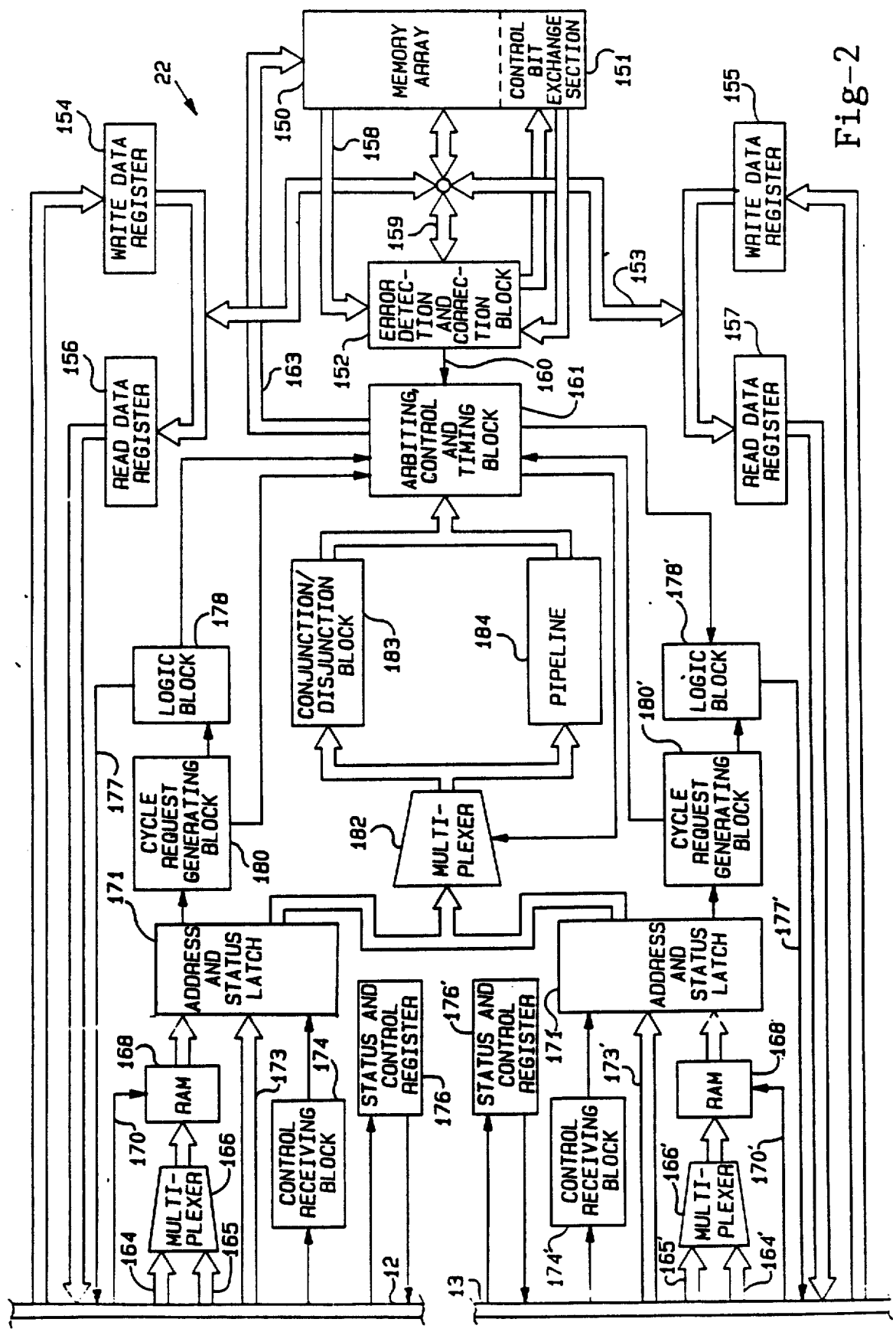
FIG. 2 shows a detailed block diagram of the memory according to the present invention.

The characteristic of the present invention enabling independent addressing of the memory in the various agent address spaces is achieved simply and cheaply by inserting, on the address route of each port, a small mapping and characterization memory similar to memories 168 and 168' in FIG. 2 and consisting of a number of words equal to the number of words addressable by the agent divided by the segment size $2^K$. The said words have N-K bits (for physical addressing of the segments on memory array 150), plus visibility, access right and any other characterization bits. The N address bits for the memory array are therefore obtained from the K least significant address bits supplied directly by the agent, and from the (N-K) segment address bits obtained from the mapping memory. The said N agent address bits are sent to the memory array via an agent address scanning block (similar to block 182 in FIG. 2) controlled by a logic control and arbitration block (similar to block 161 in FIG. 2) which receives (among other things) the visibility bits at the output of the mapping and characterisation memory, and agent access control signals, as already described with reference to FIG. 2.

An example may make this clearer.

Assuming a memory array of $2^{25}$ words, i.e. N=25; K=16 ($2^{16}$ word segment size); and an agent addressing range of $2^{24}$ words. As the agent will thus be unable to see, at the same time, more than 256 of the 512 ($2^{N-K}$) memory segments, it is possible to determine arbitrarily which of the said segments will be made visible at any given time, and for which addresses emitted by the agent, via a small 256-word mapping and characterization memory (usually having a different word length from the memory array!). Of the 24-bit address emitted by the agent, the 16 least significant bits are sent directly to the memory array, and the 8 most significant bits to the small mapping memory which, in the event a memory array segment is to be assigned to that particular address, emits the corresponding 9 segment address bits, plus a visibility bit and any other segment characterization bits.

In even more detail, if we want the segment consisting of (hexadecimal) address words 1A30000 to 1A3FFFF on the memory array to be visible and positioned, in the agent address space, between 2E0000 and 2EFFFF, the word at address 2E of the characterization memory need simply contain 1A3 as the 9 segment address bits, and the visibility bit be =1.

For switching visibility from memory segment 1A3 to segment 0F5, for example, in the same agent address space segment, this can be done by simply changing the content of word 2E on the characterisation memory from 1A3 to 0F5. This corresponds logically to transferring $2^{16}$ words from the primary to the secondary memory and vice versa, but in a performance time measurable in microseconds.

The advantages of the memory according to the present invention will be clear from the foregoing description. Firstly, it provides for exceeding the addressing limits of each agent; secondly, for dynamically switching memory data from one agent to another, thus achieving the equivalent of a data transfer at practically infinite speed; and, finally, for dynamically creating areas common to different agents, possibly with different access rights.

To those skilled in the art it will be clear that changes may be made to the embodiment of the memory described and illustrated herein without, however, departing from the scope of the present invention.

We claim:

1. A high-capacity memory (22), characterized by the fact that it is accessible by at least two external processors (17, 18), and that said memory (22) comprises first means (168, 168', 171, 171', 161, 182) for addressing the said memory (22) independently of the addresses emitted by each of the said external processors (17, 18), that for each group of address data received from the said processors (17, 18) by said memory (22) the said first means comprises match coding memory means (168, 168') for receiving a first part (165, 165') of said group of address data, a remaining second part (173, 173') of said group of address data from said processors being reunited with said first part obtained from said match coding memory means (168, 168'), the complete said group of address data being selected by selecting means (161, 152) for supply to a main memory block (150), said match coding memory means (168, 168') comprising read and write memory means, the said first part (165, 165') of the said group of address data sent to the said match coding memory means (168, 168') being the most significant part of the address data, said main memory block (150) comprising a memory of $2^N$ words divided conceptually into $2^{N-K}$ segments of $2^K$ words each, so that the physical address of any one word consists of N bits, of which N-K indicate the said segment, and K the word within the said segment; the said second part (173, 173') of the said address data supplying the said K bits, and the said first part (165, 165') of the said address data consisting of (M-K) bits, where the said group of address data supplied by the said processors (17, 18) is of M bits; the said match coding memory means (168, 168') supplying (N-K) address bits for the said segment.

2. A high-capacity memory (22), characterized by the fact that it is accessible by at least two external processors (17, 18) and that said memory (22) comprises first means (168, 168', 171, 171', 161, 182) for addressing the said memory (22) independently of the addresses emitted by each of the said external processors (17, 18), that for each group of address data received from the said processors (17, 18) by said memory (22) the said first means comprises match coding memory means (168, 168') for receiving a first part (165, 165') of said group of address data, a remaining second part (173, 173') of said group of address data from said processors being reunited with said first part obtained from said match coding memory means (168, 168'), the complete said group of address data being selected by selecting means (161, 152 for supply to a main memory block (150), said match coding memory means (168, 168') comprising read and write memory means, the said first part (165, 165') of the said group of address data sent to the said match coding memory means (168, 168') being the most significant part of the address data, said main memory block (150) comprising a memory of $2^N$ words divided conceptually into $2^{N-K}$ segments of $2^K$ words each, so that the physical address of any one word consists of N bits, of which N-K indicate the said segment, and K the word within the said segment; the said second part (173, 173') of the said address data supplying the said K bits, and the said first part (165, 165') of the said address data consisting of (M-K) bits, where the said group of address data supplied by the said processors (17, 18) is of M bits; the said match coding memory means (168, 168') supplying (N-K) address bits for the said segment, said match coding memory means (168, 168') comprising a number of words equal to ($2^M$) addressable by the processors (17, 18) divided by the size ($2^K$) of the said segments; the said words having (N-K) bits, to which are added additional coding and/or control bits.

3. A multiprocess system comprising at least two common communication lines (12, 13) of a group of common communication lines connected to a high-capacity memory, at least two external agents (17, 18) connected to each of said at least two common communication lines of said group of common communication lines, said high-capacity memory (22) accessible by said at least two external agents (17, 18) connected to each of said at least two common communication lines and means (168, 168', 171, 171', 161, 182) connected between said at least two common communication lines (12, 13) and said high-capacity memory (22) for addressing said high-capacity memory (22) independently of the addresses emitted by each of said at least two agents (17, 18) connected to each of said common communication lines (12, 13), said means for addressing comprising at least two match coding means (168, 168'), each of said at least two match coding means connected between a respective one of said at least two common communication lines (12, 13) and a main memory block (150) of said high-capacity memory (22), each of said match coding means (168, 168') having read and write memory means, for each group of address data from said at least two external agents (17, 18) said at least two match coding means (168, 168') receive and transform a first part of said group of address data, said means for addressing further comprising means (171, 171') for reuniting a remaining second part of said group of address data from said external agents with said first part transformed by said match coding means (168, 168') to form a new group of address data; and selecting means (161, 182) for selecting said new group of address data to address said main memory block.

4. A system as claimed in claim 3, characterized by the fact that said first part (165, 165') of said group of address data sent to said match coding means (168, 168') is the most significant part.

5. A system as claimed in claim 4, characterized by the fact that said main memory block (150) comprises a memory of $2^N$ words divided conceptually into $2^{N-K}$ segments of $2^K$ words each, so that the physical address of any one word consists of N bits, of which N-K indicate said segment, and K the word within said segment; said second part (173, 173') of said address data supplying said K bits, and said first part (165, 165') of said address data consisting of (M-K) bits, where said group of address data supplied by said agent (17, 18) is of M bits; said match coding means (168, 168') supplying (N-K) address bits for said segment.

6. A system as claimed in claim 5, characterized by the fact that said match coding means (168, 168') comprises a number of words equal to that ($2^M$) addressable by the agent (17, 18) divided by the size ($2^K$) of said segments; said words having (N-K) bits, to which are added additional coding and/or control bits.

7. A system as claimed in claim 3, characterized by the fact that said selecting means (182, 161) are controlled by signals from said agents (17, 18) and/or by coding and control signals from said match coding means (168, 168').

8. A system as claimed in claim 3, characterized by the fact that the read or write data from said main memory block (150) is exchanged with said agents (17, 18) via registers (154, 156; 155, 157).

9. A system as claimed in claim 3, characterized by the fact that the capacity of said memory (22) exceeds the addressing capacity of said agents (17, 18).

10. A system as claimed in claim 3, characterized by the fact that said agents (17, 18) comprise processors.

* * * * *